Sept. 14, 1965 R. H. C. HARRISON ETAL 3,205,771
PICTURE PROJECTION APPARATUS
Filed April 10, 1963 2 Sheets-Sheet 2
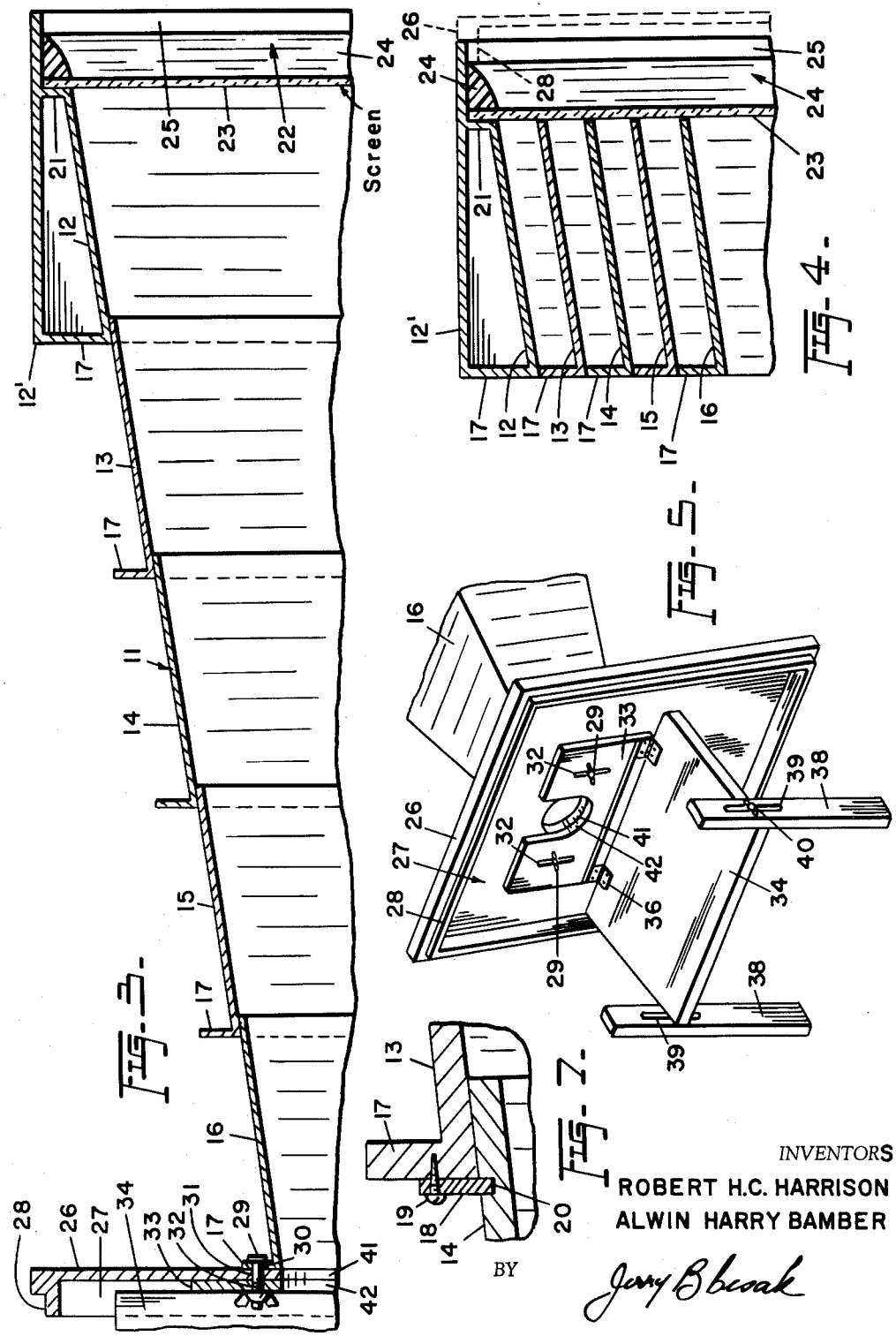
INVENTORS
ROBERT H.C. HARRISON
ALWIN HARRY BAMBER
BY

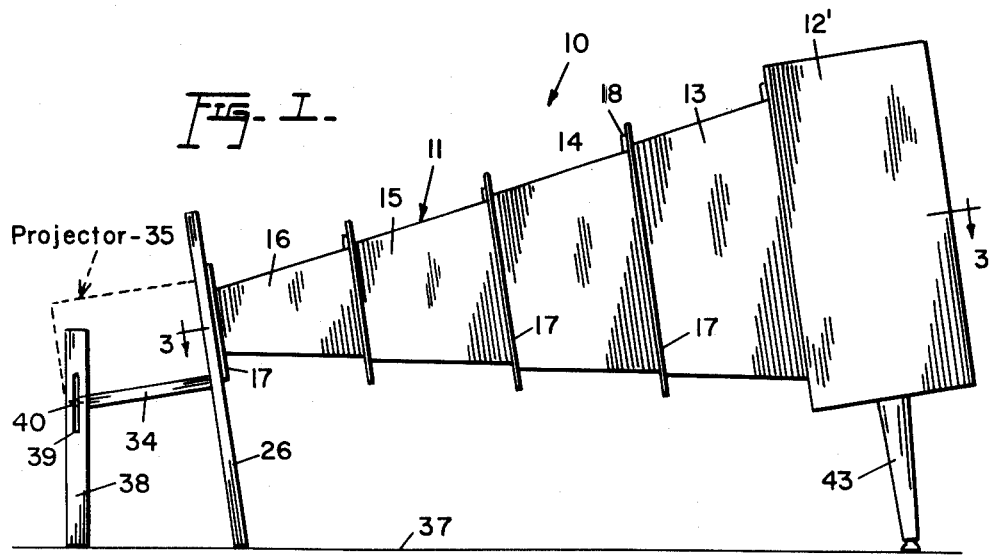
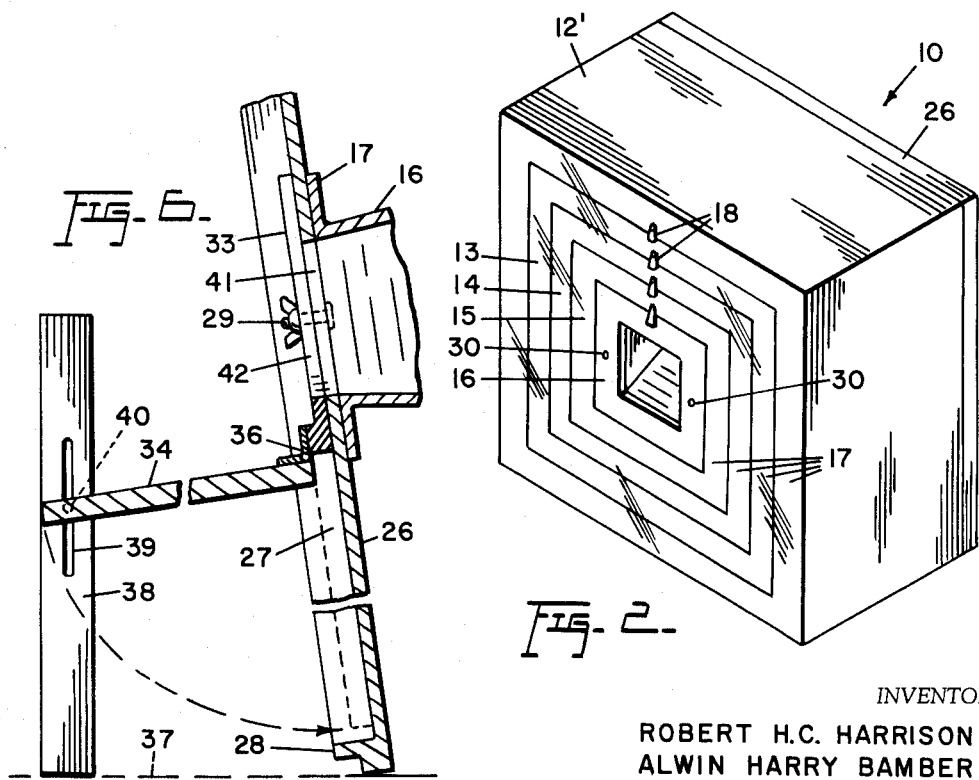
INVENTORS
ROBERT H.C. HARRISON
ALWIN HARRY BAMBER

United States Patent Office 3,205,771
Patented Sept. 14, 1965

3,205,771
PICTURE PROJECTION APPARATUS
Robert H. C. Harrison, 444–330 9th Ave. SW., and Alwin H. Bamber, 2037 Mountview Crescent, both of Calgary, Alberta, Canada
Filed Apr. 10, 1963, Ser. No. 272,075
3 Claims. (Cl. 88—24)

This invention relates to new and useful improvements in the art of picture projection, and in particular the invention concerns itself with certain improvements in the picture projection apparatus disclosed in our co-pending patent application serial No. 224,767, filed September 19, 1962, of which this application is a continuation in part.

The projection apparatus disclosed in said co-pending application embodies a rear projection screen, an elongated housing or tunnel extending rearwardly from the screen, and a suitable projector in the rear end portion of the tunnel for projecting pictures on the screen so that they may be viewed from the front of the screen without the necessity of darkening the room in which the apparatus is used.

The housing or tunnel of the apparatus in said co-pending application is of a rigid construction and of substantial length, so that some difficulty is experienced in transporting and/or storing the same when it is not in use. Moreover, the projector itself is disposed within the housing and therefore is not readily accessible for purposes of servicing or manipulation. Also, the lamp of the projector generates a considerable amount of heat which has to be discharged from the housing and fresh air taken into the housing through vents, and the presence of such vents permits outside light to be admitted into the housing which interferes with the efficiency of projection. In addition, the housing or tunnel is substantially straight-sided while the beam of projected light is rearwardly tapered, so that a considerable amount of wasted space exists in the rear end portion of the housing.

The principal object of the present invention is to eliminate the disadvantages above outlined, this being attained by the provision of an improved projection apparatus wherein the housing or tunnel is formed from a plurality of slidably telescoped sections so that it may be extended to an optimum length when the apparatus is to be used, but contracted into a highly compact form for purposes of transportation or storage.

Another feature of the invention resides in the provision of means for mounting the projector itself at the outside of the rear end of the tunnel, rather than within the tunnel, so that the projector is readily accessible for servicing or manipulation. Moreover, by disposing the projector outside of the tunnel, the need for air vents in the tunnel is eliminated and the efficiency of projection is not impaired by outside light.

In keeping with the feature of the aforementioned telescopic, sectional tunnel, another feature of the invention resides in forming the tunnel sections so that the tunnel, when extended, is rearwardly tapered more-or-less in conformity to the beam of projected light, so that the space wasting disadvantage of a straight-sided tunnel is eliminated.

A further feature of the invention resides in the provision of convenient means for releasably locking the tunnel sections in their extended as well as contracted position, so that the tunnel cannot be accidentally collapsed when in use or extended while in transport.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the projection apparatus of the invention in its extended position;

FIGURE 2 is an isometric view showing the same in its contracted or folded position;

FIGURE 3 is a longitudinal, fragmentary sectional view, taken substantially in the plane of the line 3—3 in FIGURE 1;

FIGURE 4 is a fragmentary sectional view similar to that shown in FIGURE 3 but with the tunnel sections contracted;

FIGURE 5 is a fragmentary perspective view of the rear end portion of the tunnel and the projector supporting means;

FIGURE 6 is an enlarged, fragmentary vertical sectional view of the subject shown in FIGURE 5; and FIGURE 7 is an enlarged, fragmentary sectional detail of the locking means.

Referring now to the accompanying drawings in detail, the picture projection apparatus of the invention is designated generally by the reference numeral 10 and embodies in its construction an elongated housing or tunnel 11 consisting of a plurality of slidably telescoped sections 12, 13, 14, 15, 16, the section 12 which is at the front end of the tunnel being contained in a box-like casing 12'.

Any suitable number of tunnel sections may be utilized, each section being in the form of a hollow, frusto-pyramidal body having a relatively large front end and a relatively small rear end as a result of its tapered, frusto-pyramidal configuration. The rear end of each section is slightly smaller than the front end of the next section rearwardly thereof, so that when the sections are extended as shown in FIGURES 1 and 3, the end portions of the adjacent sections are in frictional overlapped relationship and separation by sliding of one section out of the next is prevented. The rear end of each tunnel section is provided with an outwardly projecting, perimetric flange 17, and when the tunnel is contracted so that the several sections are nested together as shown in FIGURES 2 and 4, the flanges 17 of the several sections are disposed in a common plane, as will be clearly apparent. For this purpose, the outside dimensions of the flange 17 of each section are slightly smaller than those of its front end and substantially the same as the inside dimensions of the rear end of the next section forwardly thereof, sufficient clearance of course being provided to permit contraction of the tunnel without binding of the flanges in the nested together sections.

Releasable means are provided for locking the sections in either their extended or contracted position, these means comprising a set of tabs 18 which are pivotally mounted by suitable fasteners 19 on the flanges 17 of the sections 12, 13, 14 and 15. When the sections are contracted and the flanges 17 thereof are coplanar, the locking tab on each of the sections 12, 13, 14, 15 overlaps the flange of the next inner section as shown in FIGURE 2, including the flange of the innermost section 16, so that the whole tunnel is locked in its contracted position. Of course, the tabs 18 may be swung on their pivots 19 to permit the sections to be extended, when so desired. In the extended position of the sections, the locking tab on each of the sections 12, 13, 14, 15 may be swung into a groove or recess 20 formed in the next section rearwardly thereof, including the rearmost section 16, whereby to lock the whole tunnel in its extended position, as is typified in FIGURE 7.

The aforementioned box-like casing 12' at the front end of the tunnel encloses the tunnel section 12, the rear end edge of the casing being connected to the flange 17 of the section 12 while the front end of the section 12 is provided with an outturned perimetric flange or rim 21 which is connected to the casing in a plane spaced rearwardly somewhat from the open front 22 of the casing. A translucent screen 23 is mounted in the open front portion of the casing and is held against the flange or rim 21 by a suitable perimetric bead or moulding 24, it being noted that this bead or moulding is set back or recessed from the front edge of the casing as at 25. If desired or necessary, the front ends of the tunnel sections 13, 14, 15, 16 may abut the rear surface of the screen 23 when the tunnel is contracted as shown in FIGURE 4, so as to prevent the sections from rocking or otherwise shifting relative to one another while in their contracted position.

The rear end of the tunnel is provided with a panel or plate 26 which has substantially the same outside dimensions as the casing 12' so that it may be used as a cover or closure for the open front 22 of the casing when the apparatus is collapsed as shown in FIGURE 2, it being understood that in such a folded position the back of the casing is closed by the coplanar flanges 17.

The panel 26 is provided at the rear side thereof with a shallow recess 27 surrounded by a perimetric lip 28, and when the panel is used as a closure for the open front end of the casing 12', the lip 28 is received in the set back or recess 25 in the open front of the casing, as shown by dotted lines in FIGURE 4.

The panel 26 is removably attached to the flange 17 of the rearmost tunnel section 16 by suitable fasteners 29 which extend through apertures 30 formed in said flange (see FIGURES 2 and 3) and through registering apertures 31 formed in the panel 26. The fasteners 29 also extend through vertical slots 32 formed in a plate 33 which is held by the fasteners 29 against the rear side of the panel 26 and may be adjusted upwardly and downwardly relative to the panel by virtue of the slots. A shelf or platform 34 for supporting a suitable projector 35 is connected to the lower edge of the plate 33 by hinges 36, and the rear portion of the platform 34 is held in an elevated position above the floor 37 by a pair of legs 38. The latter are provided with slots 39 to receive fasteners 40 on the platform, whereby an adjustment is afforded for raising or lowering the rear end portion of the platform.

The panel 26 is formed with a circular opening 41 which is in register with the open rear end of the tunnel section 16, while the plate 33 is formed with a U-shaped recess 42 which is in register with the opening 41. The opening 41 and recess 42 permit the lense of the projector 35 to enter the rear end of the tunnel for projection of a picture through the tunnel onto the screen 23. The adjustments facilitated by the slots 32 and 39 enable the platform 34 to be raised or lowered relative to the panel 26 so as to accommodate projectors of different sizes and types.

The depth of the recess 27 at the back of the panel 26 is such that the platform 34 may fit flush into the recess when it is folded upwardly against the plate 33 after the legs 38 are removed from the platform. The legs so removed may be also accommodated in the recess 27 alongside of the folded platform, if so desired, an the panel 26 with the folded platform applied to the casing 12' for covering the open front of the latter as already explained, after the panel is removed from the tunnel section 16.

The casing 12' is supported at an elevation above the floor 37 by suitable legs 43 which are removably attached to the underside of the casing. As will be observed in FIGURE 1, the length of the legs 43 is so proportioned to the panel 26 that the tunnel 11 is rearwardly sloped, with the result that the screen 23 is rearwardly inclined for convenient viewing.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a picture projection apparatus, the combination of an elongated tunnel having front and rear ends and comprising a plurality of slidably telescoped sections whereby the tunnel may be extended and contracted in length, said tunnel sections being rearwardly tapered whereby the tunnel is of a smaller cross-section at the rear end than at the front end thereof, a casing provided at the front end of said tunnel and having an open front, a translucent screen mounted in the open front end portion of said casing, said tunnel sections being retractable into said casing behind said screen when the tunnel is contracted, detachable leg means depending from said casing for supporting the same at an elevation above a supporting surface, a substantially upright panel detachably mounted at the rear end of said tunnel and formed with an opening communicating with the interior of the tunnel, said panel having a lower edge adapted to rest upon the stated supporting surface for supporting the rear end of the tunnel at an elevation above the stated surface, the size of said panel conforming substantially to that of the open front of said casing whereby the panel may form a closure for said open front upon its detachment from the rear end of said tunnel, and a collapsible platform carried by said panel for mounting a projector whereby a picture may be projected through said panel opening and through said tunnel onto said screen.

2. The combination as defined in claim 1 together with a perimetric lip provided on the rear surface of said panel and defining a recess thereat, said platform being collapsible into said recess and said perimetric lip being received in the open front of said casing forwardly of said screen when said panel is used as a closure for said open front of the casing.

3. The combination as defined in claim 2 together with hinge means connecting one edge of said platform to the rear surface of said panel whereby the platform may be swung from a substantially horizontal operative position to a collapsed inoperative position in said recess, and leg means connected to said platform for supporting the same in its operative position.

References Cited by the Examiner

UNITED STATES PATENTS

| | | | |
|---|---|---|---|
| 1,082,914 | 12/13 | Sears et al. | 88—24 |
| 1,208,462 | 12/16 | Boernstein | 88—24 |
| 1,746,607 | 2/30 | Readeker | 88—24 |
| 2,225,012 | 12/40 | Kallusch | 88—24 |

FOREIGN PATENTS 601,685   12/25   France.

NORTON ANSHER, *Primary Examiner.*

WILLIAM MISIEK, *Examiner.*